(12) United States Patent
Micke et al.

(10) Patent No.: US 11,529,939 B2
(45) Date of Patent: Dec. 20, 2022

(54) ELECTRIC MOTOR-OPERATED DRIVE UNIT, BRAKE ACTUATOR

(71) Applicant: Robert Bosch GmbH, Stuttgart (DE)

(72) Inventors: Marc Micke, Boennigheim (DE); Patrick Budaker, Weinstadt (DE)

(73) Assignee: Robert Bosch GmbH, Stuttgart (DE)

(*) Notice: Subject to any disclaimer, the term of this patent is extended or adjusted under 35 U.S.C. 154(b) by 615 days.

(21) Appl. No.: 16/599,785

(22) Filed: Oct. 11, 2019

(65) Prior Publication Data

US 2020/0164848 A1 May 28, 2020

(30) Foreign Application Priority Data

Nov. 22, 2018 (DE) .......................... 102018219979.5

(51) Int. Cl.
| | |
|---|---|
| *B60T 17/22* | (2006.01) |
| *B60T 13/74* | (2006.01) |
| *H02K 7/102* | (2006.01) |
| *H02K 11/215* | (2016.01) |
| *H02K 7/116* | (2006.01) |

(52) U.S. Cl.
CPC ............ *B60T 17/221* (2013.01); *B60T 13/74* (2013.01); *H02K 7/102* (2013.01); *H02K 7/116* (2013.01); *H02K 11/215* (2016.01); *B60T 13/745* (2013.01); *B60T 13/746* (2013.01)

(58) Field of Classification Search
CPC ...... B60T 17/221; B60T 13/74; B60T 13/745; B60T 13/746; H02K 7/102; H02K 7/116; H02K 11/215; H02K 11/21; H02K 7/10
USPC .......................................................... 188/158
See application file for complete search history.

(56) References Cited

U.S. PATENT DOCUMENTS

| | | | | |
|---|---|---|---|---|
| 4,327,414 | A | * | 4/1982 | Klein ...................... B60T 7/042 701/79 |
| 10,150,458 | B2 | * | 12/2018 | Weh ........................ F04B 17/03 |
| 2020/0062231 | A1 | * | 2/2020 | Micke ................... B60T 13/745 |
| 2020/0164848 | A1 | * | 5/2020 | Micke ................... B60T 17/221 |

* cited by examiner

*Primary Examiner* — Ahmed Elnakib
(74) *Attorney, Agent, or Firm* — Norton Rose Fulbright US LLP; Gerard Messina

(57) ABSTRACT

An electric motor-operated drive unit, in particular for a brake actuator of a motor vehicle, includes a rotor shaft rotatably mounted in a housing; and a rotor position sensor that includes a transmitter wheel arranged on the rotor shaft in a rotatably fixed manner and a sensor fixed to the housing and assigned to the transmitter wheel, where a front face of the transmitter wheel is positioned opposite, and with an axial clearance to, a housing wall section of the housing. The transmitter wheel and/or the housing wall section are/is designed in such a way that the axial clearance increases radially outward, at least in some areas.

18 Claims, 1 Drawing Sheet

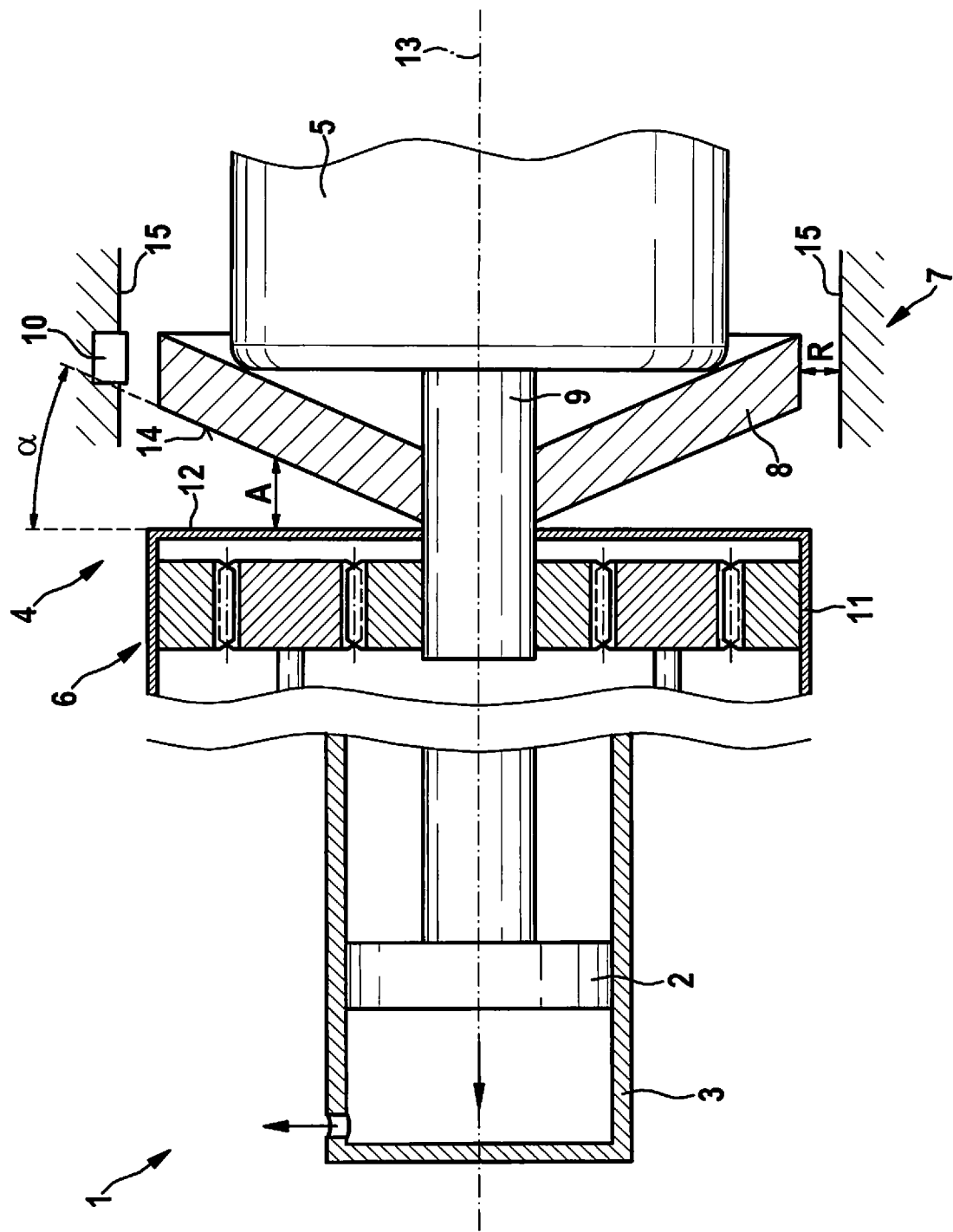

ELECTRIC MOTOR-OPERATED DRIVE UNIT, BRAKE ACTUATOR

CROSS-REFERENCE TO RELATED APPLICATIONS

The present application claims priority under 35 U.S.C. § 119 to DE 10 2018 219 979.5 filed in the Federal Republic of Germany on Nov. 22, 2018, the content of which is hereby incorporated by reference herein in its entirety.

FIELD OF THE INVENTION

The present invention relates to an electric motor-operated drive unit, in particular for a brake actuator of a motor vehicle, including: a rotor shaft rotatably mounted in a housing; and a rotor position sensor that includes a transmitter wheel situated on the shaft in a rotatably fixed manner and a sensor fixed to the housing and assigned to the transmitter wheel, where a front face of the transmitter wheel is positioned opposite a housing wall section of the housing, axially spaced apart therefrom. The present invention further relates to an electric motor-operated brake actuator, in particular a parking brake actuator, for a motor vehicle, including a displaceable brake element, in particular a brake piston or a hydraulic piston, and including the electric motor-operated drive unit coupled to the brake element for displacing the brake piston.

BACKGROUND

Drive units and brake actuators are already known from the related art. The increasing electrification of motor vehicles also increasingly affects the braking systems. Meanwhile, for example, parking brakes of motor vehicles are increasingly operated using electric motor-operated actuators. These include a brake element, for example, a brake piston, which is pressed onto a brake disk of the motor vehicle in order to fix the affected wheel. In order to move the brake element, a drive unit is provided, which includes an electric motor, which is mechanically coupled to the brake element using a spindle gear unit and/or a planetary gear unit in order to ensure a high drive force or contact force. For the regulation of the electric motor, a rotor position sensor is provided, which monitors the instantaneous rotation angle position and/or the rotational speed of the electric motor. Usually, such a rotor position sensor includes a transmitter wheel fixedly connected to the rotor shaft, as well as a sensor fixed to the housing, which is assigned to the transmitter wheel in order to detect the transmitter wheel. For example, the transmitter wheel is designed as a pole wheel, which includes one or multiple permanent magnets, whose magnetic fields are detectable by the sensor, in order to recognize the rotation angle position or the rotary motion of the electric motor. The rotor position sensor is generally integrated into a housing of the drive unit or of the gear unit. For reasons of installation space, a small clearance is frequently provided between the transmitter wheel and a housing wall section of the housing assigned to a front face of the transmitter wheel.

SUMMARY

A drive unit according to the present invention has an advantage that damage to the transmitter wheel and to the housing wall section during on-going operation is permanently prevented. Due to the embodiment of the drive unit according to the present invention, it is achieved that wear debris, lubricant, and/or brake fluid, which are expelled, in particular, from the gear unit in the direction of the transmitter wheel, does not accumulate between the end wall and the housing wall section and, as a result, on the one hand, cannot result in wear on the transmitter wheel and/or on the housing wall section and, on the other hand, can also not result in a friction effect between the transmitter wheel and the housing wall section, which counters the drive force of the electric motor. According to the present invention, it is provided, for this purpose, that the transmitter wheel and/or the housing wall section are/is designed in such a way that the axial clearance increases radially outward, at least in some areas. Due to the increasing clearance, it is achieved that particles or media which have entered the gap between the front face and the housing wall section are expelled slightly radially outward and, therefore, can no longer frictionally act between the front face and the housing wall section. In particular, dirt particles or the like are flung radially outward during operation, due to the rotation of the transmitter wheel and, as a result, are easily and reliably removed from the gap. In the present case, it is assumed that the axial clearance enlarges/increases radially outward, at least in some areas, as viewed around the entire circumference of the transmitter wheel. The consideration of the increasing axial clearance is therefore not limited to an angle segment of the transmitter wheel and/or the housing wall section, but rather relates to the entire circumference of the transmitter wheel and/or the housing section. The increase at least in some areas is to be understood to mean that the axial clearance changes or increases continuously or only in some areas in the radial extension.

According to a preferred example embodiment of the present invention, the clearance increases continuously radially outward. As a result, a uniform increase of the clearance is provided, which ensures that the particles are easily and reliably driven radially outward.

In particular, the clearance increases from the smallest diameter of the transmitter wheel up to the largest diameter of the transmitter wheel, so that the clearance increases across the entire radial extension of the transmitter wheel and a reliable removal or expulsion of dirt particles and/or liquids is ensured.

According to a preferred example embodiment of the present invention, the front face of the transmitter wheel is slanted at an angle not equal to 90° with respect to the rotation axis of the rotor shaft. The angle of the front face of the transmitter wheel differs, in particular, from the inclination angle of the housing wall section with respect to the rotation axis, which is, for example, 90° in this case. As a result, the continuously increasing axial clearance is reliably ensured and it is also achieved due to the obliquely extending front face that wear debris particles, grease, and/or other liquids located thereon are driven outward by the transmitter wheel due to the rotary motion and are removed from the gap.

According to a further example embodiment of the present invention, the housing wall section is preferably slanted at an angle not equal to 90° with respect to the rotation axis of the rotor shaft. The changing axial clearance is also ensured as a result thereof. In particular, the front face of the transmitter wheel is aligned perpendicularly to the rotation axis of the shaft. Optionally, the housing wall as well as the front face of the transmitter wheel are each slanted at an angle not equal to 90° with respect to the rotation axis of the shaft.

According to a preferred refinement of the present invention, the transmitter wheel includes a trapezoidal longitudinal section extending around the entire circumference. Therefore, the transmitter wheel overall is designed to be slanted with respect to the rotor shaft, so that it includes a V-shaped longitudinal section. As a result, the axial width of the transmitter wheel remains the same regardless of the diameter, whereby advantages result with respect to the evaluation of the magnetic fields.

According to a preferred refinement of the present invention, a radial clearance is provided between the housing and the transmitter wheel, which ensures that particles, grease, and/or liquids expelled radially outward do not result in radial friction between the transmitter wheel and the housing.

An example embodiment is directed to an electric motor-operated brake actuator including the described drive unit, yielding the noted advantages.

Further advantages and preferred features and combinations of features result, in particular, from the above description as well as from the claims.

The present invention is to be explained in greater detail in the following with reference to the drawing.

BRIEF DESCRIPTION OF THE DRAWING

The FIGURE shows a simplified longitudinal sectional representation of a brake actuator for a motor vehicle according to an example embodiment of the present invention.

DETAILED DESCRIPTION

The FIGURE shows a simplified longitudinal sectional representation of a brake actuator 1 for a motor vehicle, which is not represented here in greater detail. Brake actuator 1 includes a displaceable brake element 2 in the form of a hydraulic piston, which is mounted in a hydraulic cylinder 3. Hydraulic cylinder 3 includes an outlet, through which hydraulic medium, in particular brake fluid, is expellable from hydraulic cylinder 3 using brake element 2, in order to apply a braking force, for example, on a parking brake unit. Alternatively, brake element 2 is a brake piston, which is pressable against a brake disk of a wheel brake unit of the motor vehicle, in order to generate a braking torque or a friction torque of the parking brake.

A drive unit 4 is assigned to brake element 2, which includes an electric motor 5 and a gear unit 6 coupling electric motor 5 to brake element 2. Gear unit 6 is designed, in particular, as a combined planet wheel-spindle gear unit in the present case, which, in particular, converts a high rotational speed of electric motor 5 into a low rotational speed using great force in order to displace brake element 2.

A rotor position sensor 7 is also provided for the activation of electric motor 5. Rotor position sensor 7 includes a transmitter wheel 8, which is designed, in particular, as a pole wheel including one or multiple permanent magnets and which is situated on a rotor shaft 9 of electric motor 5 in a rotationally fixed manner. Transmitter wheel 8 is situated between gear unit 6 and electric motor 5 on rotor shaft 9. A sensor element 10 is also assigned to transmitter wheel 8, using which the magnetic field or magnetic fields of transmitter wheel 8 are detected in order to determine the rotor position. In principle, such rotor position sensors are known, so that the specific design and evaluation of the sensor signal is not explained in greater detail at this point.

Gear unit 6 is enclosed by a housing 11, so that, on the one hand, gear unit 6 is protected against external influences, and, on the other hand, the surroundings of gear unit 6 are protected against wear debris, grease, brake fluid, or the like, which could otherwise enter the surroundings out of gear unit 6. A housing wall section 12 is aligned perpendicularly to rotor shaft 9 or its rotation axis 13 and is located between transmitter wheel 8 and gear unit 6.

In order to avoid the situation in which, in particular, wear debris, lubricant, or hydraulic fluid or brake fluid between transmitter wheel 8 and housing 11 result in friction and, therefore, increased wear, transmitter unit 8 is designed in such a way that an axial clearance A between transmitter wheel 8 and housing wall section 12 increases radially outward. For this purpose, front face 14 of transmitter wheel 8, which faces housing wall section 12, is slanted at an angle α relative to housing wall section 12. Therefore, front face 14 is aligned at an angle not equal to 90° relative to rotation axis 13 of rotor shaft 9. In the present case, transmitter wheel 8 has, for this purpose, a trapezoidal profile, as viewed in the longitudinal section, which extends around the entire circumference of transmitter wheel 8, so that transmitter wheel 8 is provided with a V-shape in the longitudinal section, which encloses an obtuse angle.

Due to increasing axial clearance A, for example, wear debris and liquid, which reach transmitter wheel 8 rotating during operation by way of gear unit 6, are expelled or flung radially outward. As a result, an additional frictional effect on transmitter wheel 8 is avoided and effects such as power reduction or damage of transmitter wheel 8 during operation are avoided. Angle α is preferably selected as a function of the rotational speed normally present during operation of electric motor 5, in order to ensure a reliable expulsion of the particles or media from transmitter wheel 8 radially outward. In addition, a hardening of particles or media between transmitter wheel 8 and housing wall section 12 due to heat input in the passive or idle state is avoided. Due to the advantageous design of transmitter wheel 8, such effects are avoided and the component requirement on the transmitter wheel and, therefore, also the manufacturing costs are reduced, because the transmitter wheel can now be designed to be less robust with respect to wear debris/friction.

In particular, transmitter wheel 8 also has a radial clearance R to a section 15 of housing 11, so that particles and/or media between transmitter wheel 8 and housing 11 do not result in friction in the radial direction.

According to an example embodiment, additionally or alternatively, housing wall section 12 is aligned at a slant with respect to rotation axis 9 at an angle not equal to 90°, in order to represent angle α. In addition, both housing wall section 12 as well as front face 14 can be designed to be slanted. According to an example embodiment, in addition, the back side of transmitter wheel 8 facing away from front face 14 is aligned perpendicularly to rotation axis 13.

What is claimed is:

1. An electric motor-operated drive unit comprising:
a housing;
a rotor shaft rotatably mounted in the housing; and
a rotor position sensor that includes (a) a transmitter wheel arranged on the rotor shaft in a rotatably fixed manner and (b) a sensor assigned to the transmitter wheel, wherein:
a front face of the transmitter wheel is positioned opposite, and with an axial clearance from, a housing wall section of a first section of the housing; and at least one of the transmitter wheel and the housing wall section is designed such that the axial clearance increases radially outward in at least some areas.

2. The electric motor-operated drive unit of claim 1, wherein the clearance continuously increases.

3. The electric motor-operated drive unit of claim 1, wherein the clearance increases from a smallest diameter of the transmitter wheel up to a largest diameter of the transmitter wheel.

4. The electric motor-operated drive unit of claim 1, wherein the front face of the transmitter wheel is aligned at a slant, at an angle not equal to 90°, relative to a rotation axis of the rotor shaft.

5. The electric motor-operated drive unit of claim 1, wherein the housing wall section is aligned at a slant, at an angle not equal to 90°, relative to a rotation axis of the rotor shaft.

6. The electric motor-operated drive unit of claim 1, wherein the transmitter wheel includes a trapezoidal longitudinal section extending through an entire circumference of the transmitter wheel.

7. The electric motor-operated drive unit of claim 1, wherein a radial clearance is present between a second section of the housing and the transmitter wheel.

8. The electric motor-operated drive unit of claim 1, wherein the drive unit is configured to drive a brake actuator of a motor vehicle.

9. The electric motor-operated drive unit of claim 1, wherein the sensor is fixed to a second section of the housing.

10. The electric motor-operated drive unit of claim 9, wherein at least a portion of the transmitter wheel is arranged within the second section of the housing.

11. The electric motor-operated drive unit of claim 10, wherein a radial clearance is present between the second section of the housing and the at least the portion of transmitter wheel.

12. An electric motor-operated brake actuator of a motor vehicle comprising:
   a displaceable brake element; and
   an electric motor-operated drive unit coupled to, and configured to displace, the brake element:
   wherein:
      the drive unit includes:
         a housing;
         a rotor shaft rotatably mounted in the housing; and
         a rotor position sensor that includes (a) a transmitter wheel arranged on the rotor shaft in a rotatably fixed manner and (b) a sensor assigned to the transmitter wheel;
      a front face of the transmitter wheel is positioned opposite, and with an axial clearance from, a housing wall section of a first section of the housing; and
      at least one of the transmitter wheel and the housing wall section is designed such that the axial clearance increases radially outward in at least some areas.

13. The electric motor-operated brake actuator of claim 12, wherein the actuator is a parking brake actuator.

14. The electric motor-operated brake actuator of claim 12, wherein the brake element is a brake piston.

15. The electric motor-operated brake actuator of claim 12, wherein the brake element is a hydraulic piston.

16. The electric motor-operated brake actuator of claim 12, wherein the sensor is fixed to a second section of the housing.

17. The electric motor-operated brake actuator of claim 16, wherein at least a portion of the transmitter wheel is arranged within the second section of the housing.

18. The electric motor-operated brake actuator of claim 17, wherein a radial clearance is present between the second section of the housing and the at least the portion of transmitter wheel.

* * * * *